(12) United States Patent
Kalinski

(10) Patent No.: US 7,954,595 B1
(45) Date of Patent: Jun. 7, 2011

(54) LIGHTWEIGHT INFLATABLE BOREHOLE RECEIVER UNIT FOR SEISMIC TESTING

(75) Inventor: Michael E. Kalinski, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 12/644,655

(22) Filed: Dec. 22, 2009

(51) Int. Cl.
*G01V 1/40* (2006.01)
(52) U.S. Cl. ............ 181/104; 367/912; 367/25; 367/86
(58) Field of Classification Search .................. 181/104; 367/912, 25, 86
See application file for complete search history.

(56) References Cited

U.S. PATENT DOCUMENTS

| | | | |
|---|---|---|---|
| 2,396,935 A | 3/1946 | Walstrom | |
| 2,483,770 A | 10/1949 | Hildebrandt | |
| 2,786,987 A | 3/1957 | Jolly | |
| 4,674,570 A * | 6/1987 | Jackson | 166/187 |
| 4,899,320 A | 2/1990 | Hearn et al. | |
| 5,005,666 A | 4/1991 | Fairborn | |
| 5,027,918 A | 7/1991 | Cole | |
| 5,060,751 A * | 10/1991 | Kuhlman et al. | 181/102 |
| 5,111,903 A * | 5/1992 | Meynier | 181/102 |
| 5,212,354 A | 5/1993 | Miller et al. | |
| 5,271,469 A * | 12/1993 | Brooks et al. | 166/387 |
| 5,521,337 A | 5/1996 | Chen et al. | |
| 6,206,133 B1 | 3/2001 | Paulsson | |
| 6,712,141 B1 | 3/2004 | Bussear et al. | |
| 6,868,035 B2 | 3/2005 | West | |
| 2004/0136267 A1* | 7/2004 | Kear et al. | 367/25 |
| 2005/0100465 A1* | 5/2005 | West | 417/448 |

* cited by examiner

*Primary Examiner* — Elvin G Enad
*Assistant Examiner* — Forrest M Phillips
(74) *Attorney, Agent, or Firm* — King & Schickli, PLLC

(57) ABSTRACT

A borehole receiver for seismic testing has a support frame and an inflatable membrane configured to form a single, compact unit. The inflatable membrane has at least one sensor, such as an accelerometer affixed to the membrane. The at least one accelerometer may be adhesively affixed to an interior portion of the membrane with a cyanoacrylate adhesive. A pneumatic inflation system is used to inflate the membrane with pressurized air. In use, the membrane is slipped over the support frame and secured with a pair of O-rings. Once the borehole receiver is properly positioned in the borehole, pressurized air from the pneumatic inflation system inflates the membrane such that the at least one accelerometer achieves intimate coupling with a wall of the borehole to accurately measure dynamic seismic waves.

19 Claims, 5 Drawing Sheets

PRIOR ART

PRIOR ART

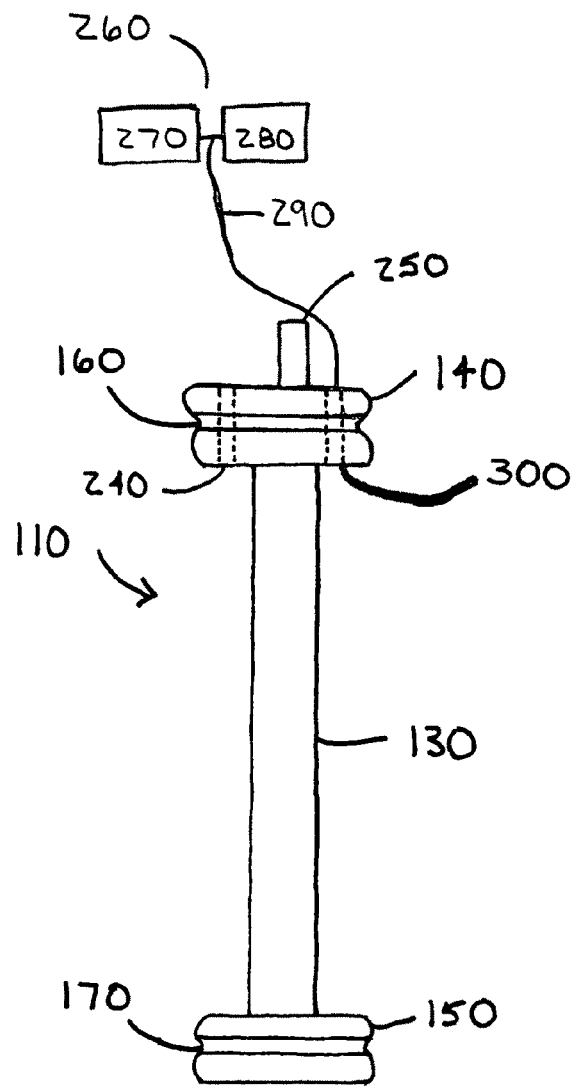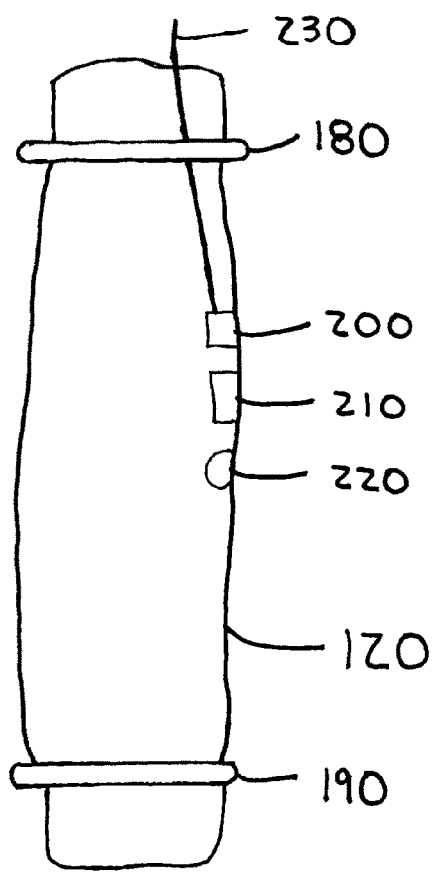
Fig. 4b
Fig. 4a

LIGHTWEIGHT INFLATABLE BOREHOLE RECEIVER UNIT FOR SEISMIC TESTING

This invention was made with at least partial Government support under NSF Award No. 0448717. The Government may have certain rights in this invention.

TECHNICAL FIELD

The present invention relates generally to a borehole receiver unit for seismic testing and, more particularly, to an improved lightweight, inflatable borehole receiver unit for measuring dynamic seismic waves in downhole and crosshole testing and a related method for positioning the borehole receiver unit in a borehole.

BACKGROUND OF THE INVENTION

Traditionally, downhole and crosshole seismic testing methods have been used to obtain numerous in-situ measurements of various geotechnical properties. For example, downhole and crosshole seismic testing methods have been used to measure compression wave (also known as P-wave) and shear wave (also known as S-wave) velocity profiles ($V_p$ and $V_s$, respectively) as well as to measure dynamic soil/rock properties, to identify soil stratification and to determine shear modulus.

The P-wave and S-wave velocity profiles measured by downhole and crosshole seismic testing have multiple uses in geotechnical design and analysis, such as the prediction and evaluation of site response to earthquake shaking. Sites often either amplify or attenuate earthquakes based upon the spectral content of the earthquake and the resonant properties of the soil/rock column. Borehole seismic data may also be used for estimating soil strength, rock rippability (i.e., the ease of excavating or blasting the rock for construction purposes) and liquefaction potential (i.e., the susceptibility of the soil to liquefaction during an earthquake) as well as void detection and two-dimensional tomography.

Generally, downhole and crosshole seismic testing methods have employed the use of multi-component (i.e., two- or three-component) borehole receiving devices. Specifically, these devices include one or more receivers or geophones enclosed within a cylindrical housing made of metal or plastic. The housing is lowered into a cased or uncased borehole. In order to attempt to achieve intimate coupling between the geophones and the borehole wall, which is advantageous for obtaining accurate measurements of the P-wave and S-wave velocity profiles, an inflatable bladder (separate and distinct from the geophones housing) is used in conjunction with the geophones housing. A traditional borehole receiving device 10 with an inflatable bladder 20 and a receiver housing 30 is illustrated in FIG. 1. Alternatively, a spring-loaded or clamping mechanism may be used. In use, the bladder or other mechanism is lowered into the borehole and inflated in order to attempt to achieve intimate coupling between the geophones 40 and the borehole wall 50.

Although the conventional configuration for borehole receiving devices discussed above has been used for decades, these multi-component units suffer from certain limitations. As illustrated in FIG. 2, when the borehole wall is irregularly shaped, it is difficult to achieve intimate coupling between the geophones housed within the casing or housing and the borehole wall due to the use of the separate inflatable bladder. As a result, accurate P-wave and S-wave velocity profiles measurements are difficult (if not impossible) to achieve.

Even when intimate coupling is possible between the geophones and the borehole wall (i.e., when the borehole wall is regularly shaped) such that accurate P-wave and S-wave velocity profile measurements may be ascertained, the receiving devices are still relatively heavy, cumbersome and difficult to use. Consequently, these devices are difficult to transport to and from the desired borehole site. In particular, these devices often weigh at least several kilograms and may be up to half a meter (0.5 meters or 50 centimeters) in length.

Accordingly, the art of borehole receivers for seismic testing has a need for a borehole receiver that incorporates the housing and inflatable bladder into a single, compact unit to ensure excellent coupling between the device and the borehole wall regardless of the shape of the borehole wall. In addition, the art of borehole receivers for seismic testing has a need for a simpler, lightweight borehole receiver for seismic testing. Finally, the art of borehole receivers for seismic testing has a need for a borehole receiver that is easily constructed and having dimensions that are easily modified to suit any borehole diameter.

SUMMARY OF THE INVENTION

The above-mentioned and other problems become solved by applying the principles and teachings associated with the hereinafter described borehole receiver unit for crosshole and downhole dynamic seismic testing.

In a basic sense, the borehole receiver unit includes a frame and an inflatable membrane. The membrane is placed over the frame to encase it such that it forms a single, compact unit. The membrane includes at least one sensor, such as an accelerometer affixed to the membrane for measuring particle acceleration. The borehole receiver unit also includes a pneumatic inflation system for inflating the membrane with pressurized air. Advantageously, the borehole receiver unit forms a single unit, which is lightweight and compact for easier use and transport. In addition, the borehole receiver unit allows for intimate coupling between the at least one accelerometer and the borehole wall to ensure reliable measurements.

In one embodiment, the frame includes a bar having a first end piece at one end of the bar and second end piece at the other end of the bar. Each of the first and second end pieces has a groove. A pair of O-rings may be positioned in the respective grooves such that the membrane is captured between the pair of O-rings and the end pieces so as to be tightly sealed to the frame. Once the borehole receiver unit is properly assembled, it may be lowered into the borehole. Subsequently, an operator may inflate the membrane with pressurized air from the pneumatic system such that the at least one accelerometer achieves intimate coupling with the borehole wall.

In other aspects of the invention, the bar and first and second end pieces are made from a rigid material, such as aluminum. The diameter of the membrane is less than an outer diameter of either of the first and second end pieces to avoid folds in the membrane at the top and bottom of the borehole receiver unit. The at least one accelerometer may be adhesively affixed to the inside of the membrane by a cyanoacrylate adhesive. The membrane should be inflated to a pressure that is low enough to prevent bursting of the membrane, but high enough to ensure intimate physical coupling between the accelerometers and the inside of the borehole. This pressure would generally be in the 20-50 kPa range.

These and other embodiments, aspects, advantages, and features of the present invention will be set forth in the description which follows, and in part will become apparent to those of ordinary skill in the art by reference to the following description of exemplary embodiments of the invention and referenced drawings or by practice of the invention. The aspects, advantages, and features of the invention are realized and attained according to the following description and as particularly pointed out in the appended claims.

BRIEF DESCRIPTION OF THE DRAWINGS

The accompanying drawings incorporated herein and forming a part of the specification, illustrate several aspects of the present invention and together with the description serve to explain certain principles of the invention. In the drawings:

FIG. 4a is a front view of a support frame of the present invention;

FIG. 4b is a front view of an inflatable membrane of the present invention; and

Reference will now be made in detail to the present preferred embodiment of the invention, examples of which are illustrated in the accompanying drawings.

DETAILED DESCRIPTION OF THE DRAWINGS

In the following detailed description of the drawings, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process or other changes may be made without departing from the scope of the present invention. The following detailed description is, therefore, not to be taken in a limiting sense, and the scope of the present invention is defined only by the appended claims and their equivalents. In accordance with the present invention, a borehole receiving unit for seismic testing is hereinafter described.

Figure 1:
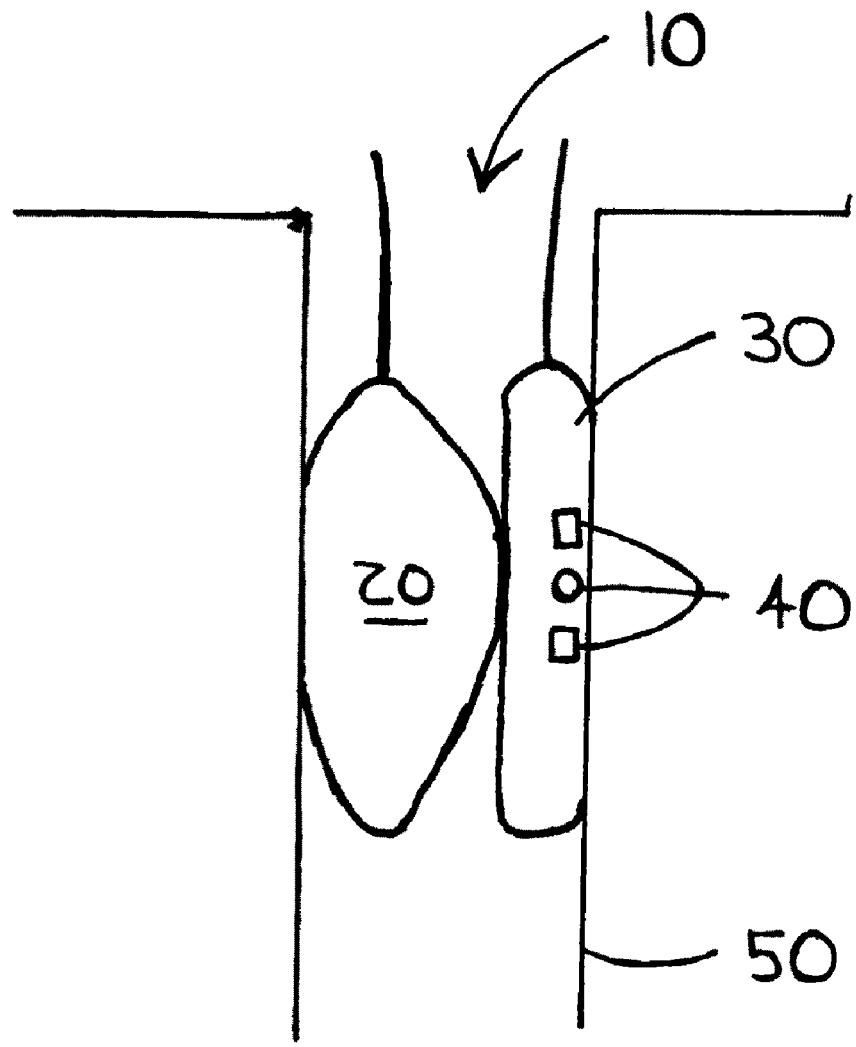
FIG. 1 is a representative view of a traditional borehole receiver.
Figure 2:
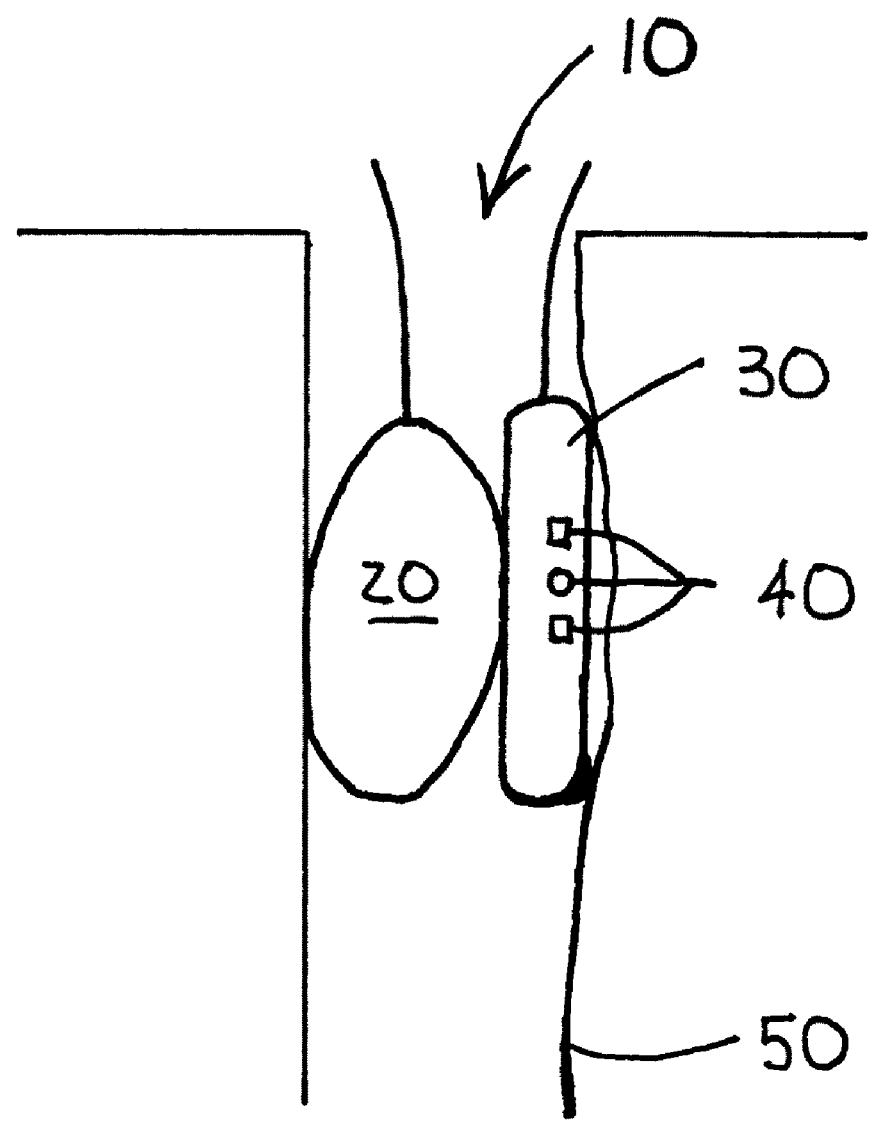
FIG. 2 is a representative view of the traditional borehole receiver in an irregularly shaped borehole wall.
Figure 3:
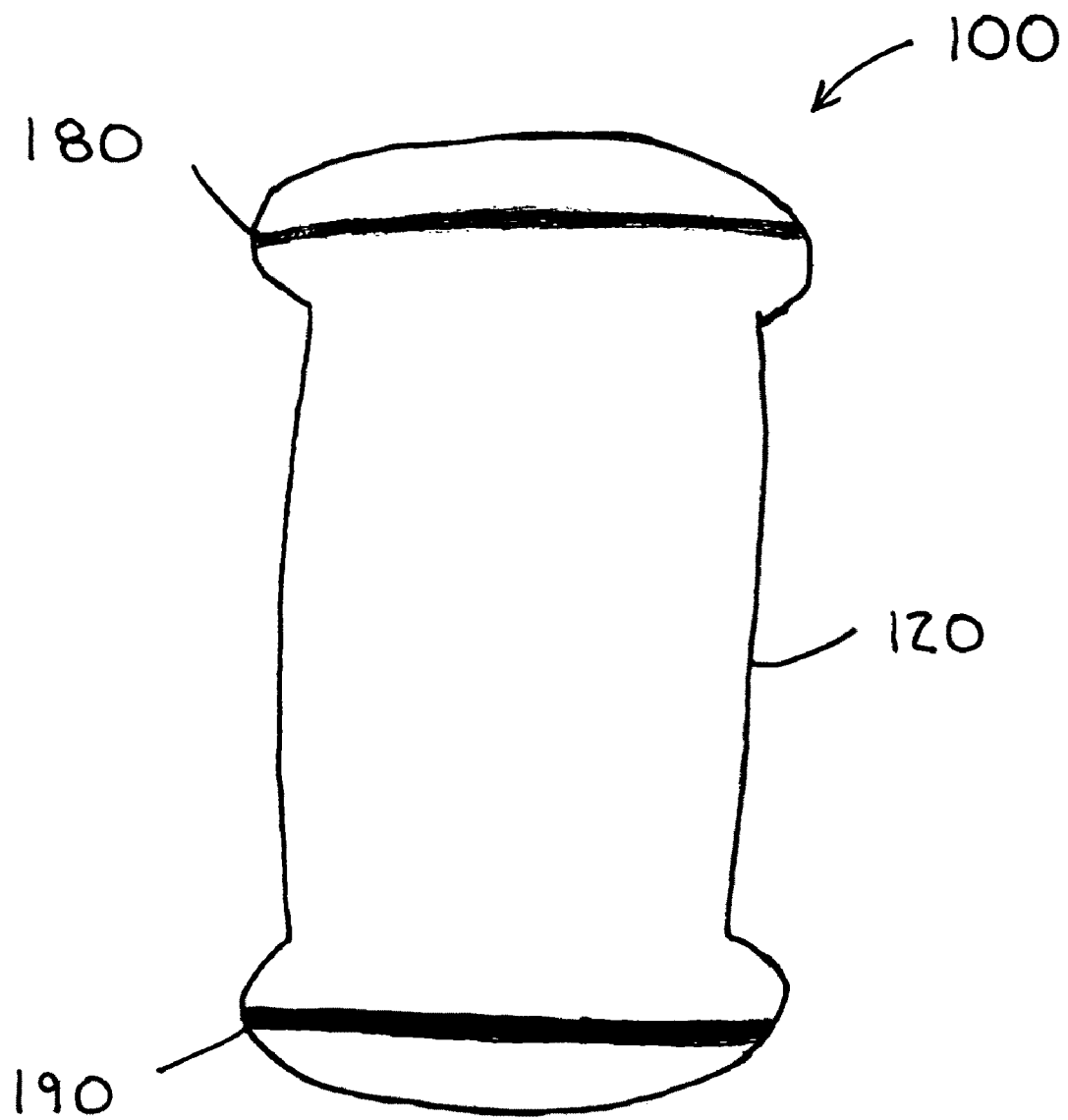
FIG. 3 is a representative view of a borehole receiver of the present invention.

With reference to FIG. 3, a borehole seismic receiver unit 100 according to one embodiment of the present invention is illustrated. The receiver unit 100 is used for crosshole and downhole seismic testing. In more detail, the receiver unit 100 is used to measure dynamic seismic waves with an oscilloscope or signal analyzer (not shown). Turning to FIGS. 4a and 4b, the receiver unit 100 includes a frame 110 and an inflatable membrane 120. The frame 110 supports the membrane 120 and includes a bar 130 and a pair of round end pieces or end caps 140 and 150. Each of the pair of end pieces 140 and 150 has a groove 160 and 170 extending substantially around the respective end piece. The bar 130 may be made of any rigid material, such as aluminum or other metals. The bar 130 may be wrapped with tape or another similar material to secure any wires (i.e., accelerometer lead wires) used with the device 100. Similarly, each of the pair of end pieces 140 and 150 is substantially round and made of a rigid material, such as aluminum. A first of the pair of end pieces 140 is positioned at a first end (or top end) of the bar 130. A second of the pair of end pieces 150 is positioned at a second end (or bottom end) of the bar 130.

Figure 5:
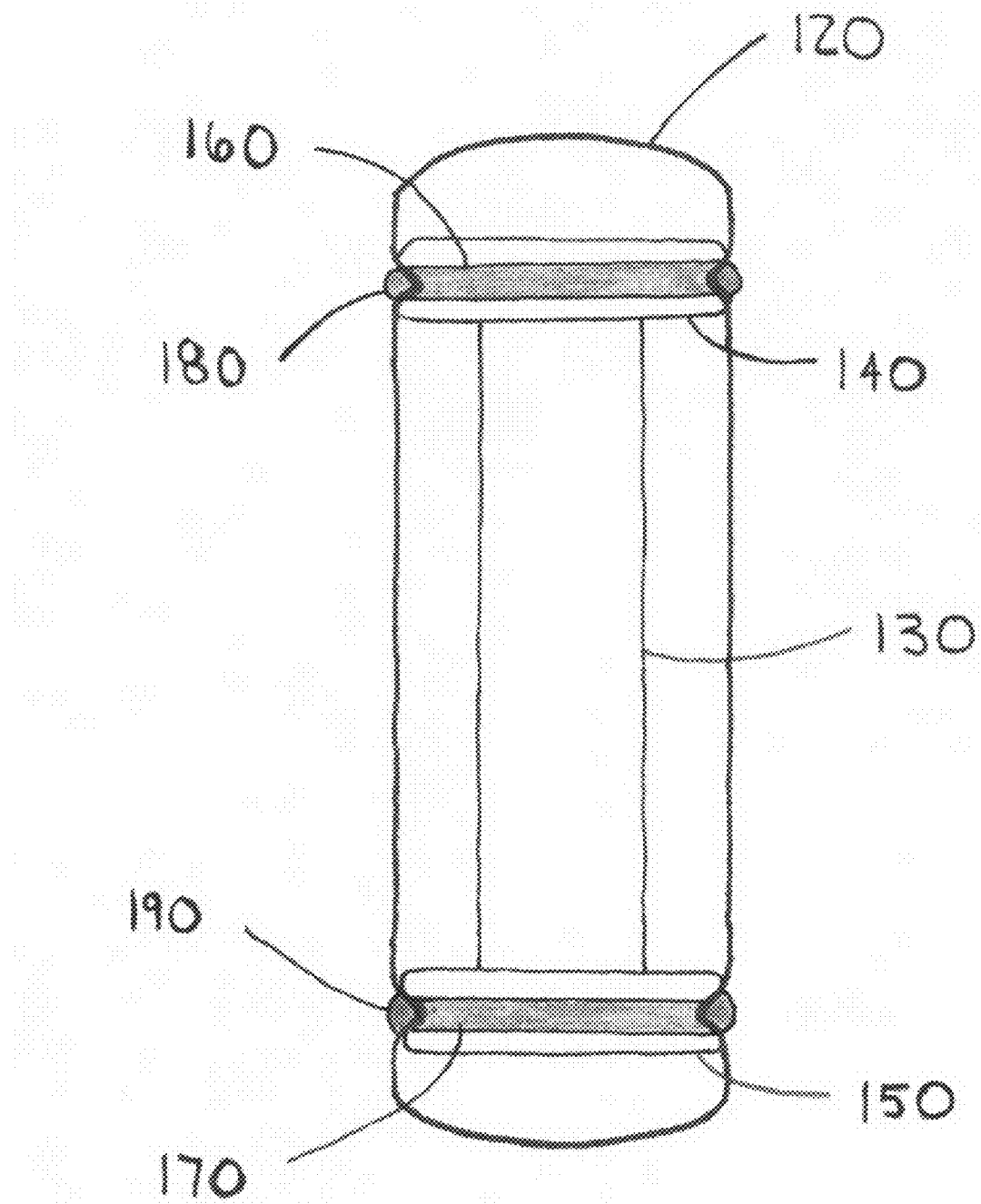
FIG. 5 is a cross-section view of the borehole receiver of the present invention.

The inflatable membrane 120 is made of a thin, polymeric material, such as latex. The latex membrane may be the same type of membrane used for geotechnical laboratory triaxial strength testing. The specific size of the membrane may vary in diameter depending on the desired size of the receiver unit. It is important for the diameter of the membrane to be slightly less than the diameter of the pair of end pieces to avoid folds in the membrane at the top and bottom of the unit. A first O-ring 180 is placed over a top portion of the membrane 120 and a second O-ring 190 is placed over a bottom portion of the membrane 120 such that the membrane is captured between the O-rings to tightly seal the membrane to the end pieces 140 and 150 of the frame 110 as perhaps best illustrated in FIG. 5. The first and second O-rings 180 and 190 are seated in the grooves 160 and 170, respectively, to prevent them from rolling.

The inflatable membrane 120 has at least one sensor or transducer such as an accelerometer 200 affixed to the membrane for measuring acceleration. Accelerometers are used instead of geophones or velocity transducers known in the art because of their compact size. Further, the accelerometers are used to measure particle acceleration instead of measuring particle velocity in terms of distance per unit time as in velocity transducers known in the art. As shown in FIG. 4b, three accelerometers, 200, 210 and 220 are illustrated. In one embodiment, Wilcoxon T736 accelerometers having a length of 24 mm, a diameter of 12 mm and a weight of 13 grams are used. Of course, it should be appreciated that other types of accelerometers may be used. Preferably, the accelerometers 200, 210 and 220 are affixed or glued to the inside of the membrane 120 using an adhesive, such as cyanoacrylate adhesive. Cyanoacrylate adhesive performs more effectively on latex membranes than other epoxy or silicon adhesives. The accelerometers may be affixed to the membrane in any of three orthogonal directions depending on the desired waveform to be measured and whether the receiver unit is used with orientation rods.

Prior to use in a cased or uncased borehole, the membrane 120 is carefully slipped over the frame 110 and completely encases the frame. The frame 110 and membrane 120 together form a single compact borehole receiver unit that resembles a single pressuremeter-like unit. Advantageously, the unit 100 is relatively compact and lightweight, which allows for easier use and transport. In more detail, the unit 100 is approximately 19 cm in length and 6.4 cm in diameter and weighs less than 0.68 kg, which is considerably smaller than traditional borehole receiving devices. It should be appreciated that the dimensions of the receiver unit 100 may be varied to accommodate different borehole sizes. Furthermore, the receiver unit can be used to produce reliable results at depths of at least 60 meters.

Once the membrane 120 is slipped over the frame 110, sensor lead wires may be connected to the accelerometers. As shown in FIG. 4b, a sensor lead wire 230 is connected to accelerometer 200. The lead wire 230 is connected at one end with the at least one accelerometer 200 through a sealed hole 240 located in the first end piece 140 of the frame 110. The other end of the lead wire 230 is connected to the oscilloscope or signal analyzer. Subsequently, the pair of O-rings 180 and 190 is placed over the membrane 120 to seal the membrane to the end pieces 140 and 150 of the frame 110. The pair of O-rings 180 and 190 is positioned in the corresponding pair of grooves 160 and 170 to secure the membrane 120 to the frame 110. At this time, the receiver unit 100 is ready to be lowered into the borehole by the use of a steel cable 250 or other suitable means.

During use, the unit 100 is lowered into the borehole. An eyelet or other suitable element (not shown) may be attached to the first end piece 140 of the frame 110 to assist in lowering the unit 100. Specifically, a rope or other suitable means may be tied around the eyelet to facilitate lowering the unit 100 into the borehole and allowing the unit to be suspended. Once the unit 100 is lowered into the borehole and properly positioned, the membrane 120 is inflated to a pressure that is low enough to prevent bursting of the membrane, but high enough to ensure intimate physical coupling between the accelerometers and the inside of the borehole. This pressure would generally be in the 20-50 kPa range.

The membrane is inflated by a pneumatic system 260, which includes an air compressor 270, a pressure regulator 280 and a supply line 290. A hole 300 is located in the first end piece 140 such that the supply line 290 of the pneumatic system 260 is fixed in the hole 300 in fluid communication with the membrane 120 in order to inflate it with pressurized air. Once the membrane 120 is properly inflated, the membrane is able to conform to the contours and any irregularities inside the borehole such that intimate coupling between the receiver unit 100 and the borehole wall is achieved. Advantageously, the accelerometers 200, 210, 220 are intimately coupled to the borehole wall to obtain accurate measurements of dynamic seismic waves.

The use of the pneumatic system 260 as opposed to an in-hole hydraulic system or other types of systems offers numerous advantages. For example, a hydraulic system requires the use a well tool and an external electric power source to deliver hydraulic oil, which are not needed in the pneumatic system disclosed herein. As a result, the present invention is less cumbersome because there is less equipment in the borehole. Further, the reliance upon pressurized air rather than hydraulic oil eliminates any potential negative environmental impact, such as groundwater contamination from leakage. Finally, the amount of volume change allowed in a hydraulic system is limited by the volume of oil in the well tool. In contrast, the present invention is able to provide intimate coupling between the accelerometers 200, 210, 220 and the borehole wall because of the use of pressurized air rather than hydraulic oil.

The foregoing description of the preferred embodiments of the present invention has been presented for purposes of illustration and description. It is not intended to be exhaustive or to limit the invention to the precise form disclosed. Obvious modifications or variations are possible in light of the above teachings. For example, the membrane 120 may be made from a material other than latex. Further, different adhesives may be used depending on compatibility with the material selected for the membrane.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed is:

1. A borehole receiver unit for seismic testing, comprising:
a support frame;
an inflatable membrane formed of a polymeric material wherein said membrane completely encases the support frame;
at least one sensor attached to the membrane; and a pneumatic inflation system configured to inflate the membrane with pressurized air.

2. The unit according to claim 1, wherein the support frame includes a bar having a first end piece at one end of the bar and a second end piece at another end of the bar.

3. The unit according to claim 2, wherein the bar, first end piece and second end piece are made of metal.

4. The unit according to claim 2, wherein the first end piece has a first groove and the second end piece has a second groove.

5. The unit according to claim 4, further including a first O-ring positioned in the first groove of the first end piece and a second O-ring positioned in the second groove of the second end piece such that the membrane is captured between said first and second O-rings and said first and second end pieces so as to be tightly sealed to the support frame.

6. The unit according to claim 2, wherein the diameter of the membrane is less than an outer diameter of either of the first and second end pieces.

7. The unit according to claim 1, wherein the membrane is formed of latex.

8. The unit according to claim 1, wherein an adhesive affixes the at least one sensor to an interior portion of the membrane.

9. The unit according to claim 8, wherein the adhesive is cyanoacrylate.

10. The unit according to claim 1, further comprising a sensor lead wire connected to the at least one sensor.

11. The unit according to claim 1, wherein the pneumatic inflation system includes an air compressor, a pressure regulator and a supply line.

12. The unit according to claim 1, wherein the at least one sensor is an accelerometer.

13. A borehole seismic receiver for measuring dynamic seismic waves within a borehole, comprising:
a support frame and an inflatable latex membrane configured to form a single unit such that the inflatable latex membrane completely encases the support frame;
a plurality of accelerometers adhesively affixed to an interior portion of the inflatable membrane; and
a pneumatic inflation system for inflating the membrane with pressurized air such that each of the plurality of accelerometers is intimately coupled to a wall of the borehole.

14. The receiver according to claim 13, wherein the support frame includes a bar, a first round end piece having a first groove and a second round end piece having a second groove.

15. The receiver according to claim 14, wherein a first O-ring and a second O-ring are positioned over the membrane.

16. The receiver according to claim 15, wherein the first and second O-rings are seated in the respective first and second grooves to secure the end pieces and to seal the membrane to the end pieces.

17. A method for positioning a borehole seismic receiver unit having a support frame and an inflatable membrane with a plurality of accelerometers affixed to an interior portion of said membrane into a borehole, comprising:
assembling the borehole seismic receiver unit by slipping the membrane over the entirety of the support frame;
lowering the borehole seismic receiver unit into the borehole; and inflating the membrane with pressurized air such that the plurality of accelerometers achieve intimate coupling with a wall of the borehole.

18. The method according to claim 17, wherein the assembling step includes placing a pair of O-rings over the membrane to tightly seal the membrane to the support frame.

19. The method according to claim 17, wherein the assembling step includes positioning a pair of O-rings in a corresponding pair of grooves on the support frame to secure the membrane to the support frame.

* * * * *